United States Patent [19]

McCoubrey

[11] 4,189,283
[45] Feb. 19, 1980

[54] ROTOR HUB FOR A HELICOPTER

[75] Inventor: George A. McCoubrey, Westfield, Mass.

[73] Assignee: The United States of America as represented by the Secretary of the Navy, Washington, D.C.

[21] Appl. No.: 924,024

[22] Filed: Jul. 12, 1978

[51] Int. Cl.$^2$ .................. B64C 21/04; B64C 11/06
[52] U.S. Cl. ................................ 416/20 A; 416/141
[58] Field of Search ............... 416/20 R, 20 A, 90 A, 416/138 A, 141

[56] References Cited

U.S. PATENT DOCUMENTS

| 2,845,131 | 7/1958 | Laufer | 416/20 A |
| 3,524,711 | 8/1970 | Cheeseman et al. | 416/90 A |
| 3,567,332 | 3/1971 | Seed | 416/90 A |
| 3,612,444 | 10/1971 | Girard | 416/20 R |
| 4,040,578 | 8/1977 | Yuan | 416/20 R |
| 4,080,098 | 3/1978 | Watson | 416/138 A |

*Primary Examiner*—John J. Vrablik
*Attorney, Agent, or Firm*—R. S. Sciascia; Paul S. Collignon

[57] ABSTRACT

A rotor hub for a helicopter having a hum member rotatably mounted to a rotor mast stationarily attached to the fuselage of a helicopter and forming an air plenum for circulation control. A shaft, which is driven from a transmission, drives a torque plate which is attached to the top of the hub member. A flexible hub plate is attached to a flange on the hub member and has a plurality of axles to which the rotor blades are individually attached. Air from inside the plenum is piped to the rotor blades through flexible ducts. The flexible hub plate is designed to provide a high degree of stiffness in the plane of rotation and a lesser degree of stiffness in a plane normal to the plane of rotation.

2 Claims, 2 Drawing Figures

ROTOR HUB FOR A HELICOPTER

BACKGROUND OF THE INVENTION

The present invention relates to a rotor hub for a helicopter and more particularly to a rotor hub for a helicopter that is equipped with a circulation control rotor.

Presently, maximum useable airspeed in helicopters is limited because of loss of lift and other problems encountered with helicopter rotors at high speeds. At any given instant, one or more rotor blades, referred to as "the advancing blade", are in the part of their rotation cycle where the effective airspeed experienced is the sum of their rotational velocity and the helicopter's forward airspeed. At the same time, the blade or blades mounted on the rotor opposite the advancing blade experience an effective airspeed equal to their rotational velocity less the forward airspeed of the helicopter. These blades are referred to as "the retreating blade". It will be appreciated that as helicopter forward airspeed increases, the effective airspeed at the advancing blade increases, while the effective airspeed at the retreating blade decreases. Since the contribution to total effective airspeed of the rotor blade due to the blade's rotational velocity is a function of the radial distance from the rotor hub, the point on the rotor experiencing the highest total effective airspeed is at the tip of the advancing blade, while the lowest total effective airspeed will be found near the root of the retreating blade. Both of these effects lead to problems at high speeds.

The main problem associated with the rotor when the helicopter is at high airspeed involves loss of lift on the retreating rotor blade, due to low effective airspeed and high angle of attack. The angle of attack of the retreating blade is increased at high helicopter airspeed because the induced velocity becomes large in relation to the oncoming free stream velocity. When the angle of attack reaches about 14° the airfoil section stalls and the lift is appreciably reduced. The low effective airspeed experienced by the retreating blade when the helicopter is at high airspeed also contributes to loss of lift. At still higher helicopter airspeeds a portion of the retreating blade near the rotor hub actually experiences reverse flow, i.e., airflow from trailing edge to leading edge, because the helicopter forward airspeed exceeds the product of rotational velocity times distance from the rotor hub. This region of reverse flow extends further outward on the retreating blade as helicopter airspeed continues to increase. Heretofore, this region has been relatively useless for producing lift, and in fact has contributed to much buffeting and vibration of the rotor blade.

One conventional means for altering the lift of helicopter blade is to cyclically alter the blade angle of attack and the blade speed. This has been accomplished by mechanical means.

A second method employs a circulation control rotor blade which carries air for circulation control blowing. A number of slots are provided in the blade and, as the blade is rotated, air is blown out these slots in a thin sheet. The thin sheet adheres to the trailing edge and remains attached, by the Coanda effect, until it reaches the separation point on the blade under side, beneath the trailing edge. The point of separation beneath the trailing edge is determined by the intensity of blowing. The effect of the circulation control is to relocate the stagnation stream lines and produce a higher lift on the foil, the lift on the airfoil being functionally related to the ratio of the velocity of the blown air to the free stream velocity blowing over the rotating wing.

In very heavy and highly sophisticated helicopters, both mechanical devices for altering the blade angle of attack and circulation control rotor blades are used for altering lift. In such devices, however, numerous problems arise in the rotor hub due to the complicated mechanisms which are required to perform the desired end result of increasing lift.

SUMMARY OF THE INVENTION

The present inventon relates to a rotor hub for a helicopter and provides a rotor mast which is stationarily attached to the fuselage of a helicopter. The rotor mast forms a portion of an air plenum chamber and carries rotor thrust loads and hub moments to the fuselage structure of the helicopter. A rotating barrel is rotatingly supported by bearings on the rotor mast and serves as the top section of the air plenum chamber. This rotating barrel is provided with an annular flange and a flexible hub plate is attached to the flange. The flexible hub plate has a central flat plate section and has a plurality of axles which rotatably support rotor blades.

A torque plate is attached to the top surface of the rotating barrel and is driven by a quill shaft which is connected with a transmission. Air from inside the plenum is piped by flexible ducts to each rotor plate for circulation control and valves are provided inside the plenum for controlling the flow of air to the rotor blades.

It is therefore a general object of the present invention to provide an improved rotor hub for supporting the rotating blades of a helicopter.

Other objects, advantages and novel features of the present invention will become apparent from the following detailed description of the invention when considered in conjunction with the accompanying drawing.

DESCRIPTION OF THE PREFERRED EMBODIMENT

Figure 1:
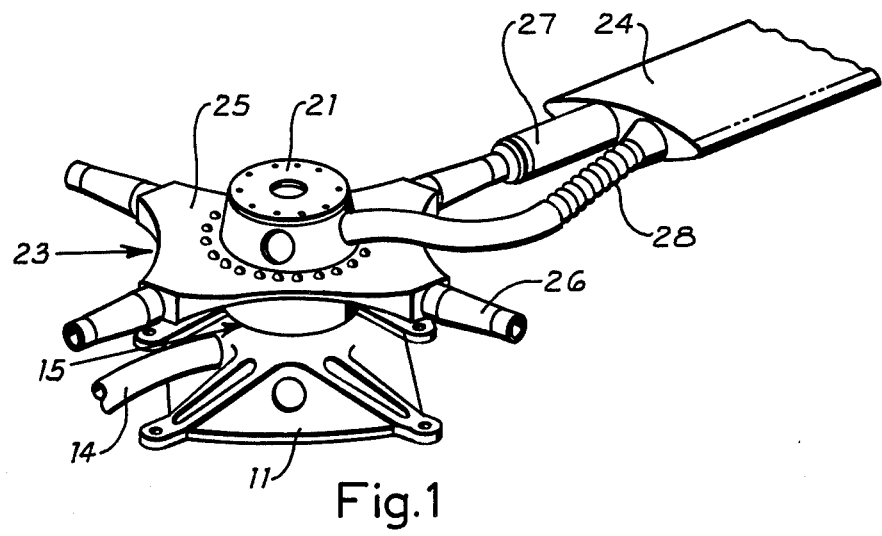
FIG. 1 is a perspective view showing a preferred embodiment of the present invention.

Referring now to the drawing, a rotor mast 11 is adaptable for attaching, as by bolting, to a fuselage 12 of a helicopter and rotor mast 11 is positioned so that a drive connection can be made from a transmission to the rotor blades. The inside of rotor mast 11 forms the lower portion of an air plenum 13 which is supplied with air from a compressor through one or more air ducts 14. A rotor hub 15 is rotatably supported on a cylindrical portion 16 of rotor mast 11 by bearings 17 and is provided with an annular flange 18. The upper portion 19 of hub member is of general frustroconical shape and the top of hub member 15 is closed by a torque plate 21. A quill shaft 22 engages torque plate 21 and driving torque from a transmission is transferred through shaft 22 to rotor hub 15.

A flexible hub plate 23 is attached, as by bolting, to flange 18 of rotor hub 15 and the main function of hub plate 23 is to support the rotor blades 24. (Only one blade 24 of 4 blades is shown in FIG. 1 of the drawing.)

Flexible hub plate 23 has a central flat plate region 25 and integral therewith are four pitch axles 26 which project radially outward from the flat plate region 25. Axles 26 are designed to support bearings (not shown) to permit control of the pitch angles of rotor blades 24 and to react the centrifugal tension loads developed by the blades during operation. A pitch blade attachment member 27 encloses a pitch axle 26 and the bearings described and member 27 may be configured either as an integral part of the structure of blade 24 or might be a separate element having suitable attachment means to the end of blade 24.

Flexible hub plate 23 is provided primarily to overcome difficulties that are intrinsic to earlier disclosed concepts of rotor hubs for circulation control rotors. Those earlier concepts envisioned a hub configuration similar to that utilized on most of the controllable pitch propellers used on aircraft for many years. In such a concept, either the pitch axles (inner members) or the pitch housing (outer diameter) are made integral with a central housing of a generally cylindrical configuration, which contained the mechanisms for control of blade pitch. The resulting overall hub structure has inherent strength and stiffness well suited to the adequate support of propeller blades, and could be designed and proportioned so that the bending natural frequencies of the blades, both in and out of the plane of rotation were such that potentially destructive resonances during operation could be avoided. In adapting this propeller-like configuration to a hub for circulation control helicopter rotors, the control air flow was intended to be carried from the hub to the blades through the hollow inner elements of the pitch hinges. A constraint was thus imposed on the minimum diameter of these members, by the duct cross section at which pneumatic losses became prohibitive, due to increased flow velocity. There was thus introduced an inherent minimum bending stiffness of the blade support, and since the primary blade bending modes in such a "rigid" (or "hingeless") type rotor are cantilever modes, stiffnesses in the root region are dominant in determining blade frequency. Analysis of the dynamics of this propeller-like concept indicated, that, while destructive resonances could be avoided, the lowest level of stiffness that was practical to achieve the blade bending normal to the plane of rotation, resulted in a frequency that was excessively high compared to that desired for good longitudinal stability characteristics of the complete aircraft. In order to avoid the need to incorporate more costly and complex automatic stabilization control systems than would otherwise be required, a configuration for the hub was sought which would remove the "minimum stiffness" constraint imposed by the pneumatic duct requirement. Additionally, it was desired that the new design should be such that significantly different stiffnesses could be selected for the blade support in the plane of rotation and normal to that plane, in order to provide numerical separation of these frequencies and thus avoid dynamic problems associated with the "coalescence of modes". Flexible hub plate 23 will be seen to provide, in its central plate-like region 25 integral supports for the blade 24 in the form of flexures; oriented to provide higher bending stiffness in the plane of rotation (due to the width of the plates) than normal to that plane (due to the thinness of the plates).

Blades 24 are designed as circulation control rotor blades and air from plenum 13 flows through flexible ducts 28 to the inside of rotor blades 24. One air duct 28 is provided for each blade 24 and has the primary function of carrying the circulation control air flow which has been modulated by valving means 29 located within plenum 13. Such valving means are well-known in the art and, by way of example, one such valving means is shown and described in U.S. Pat. No. 3,567,332, entitled, "Helicopter Rotors and The Like", which issued Mar. 2, 1971, to Austin Seed.

Figure 2:
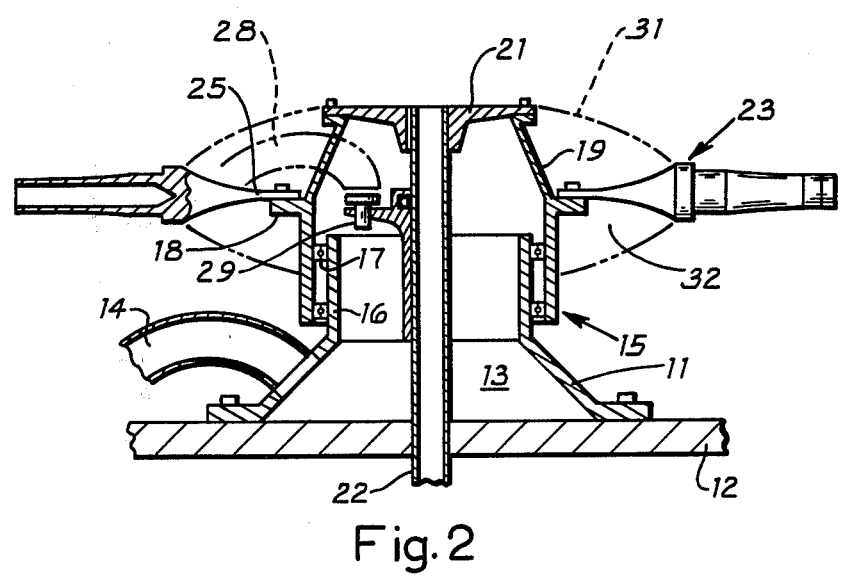
FIG. 2 is a sectional view of the preferred embodiment shown in FIG. 1 of the drawing.

Referring to FIG. 2 of the drawing, broken lines 31 represent a fairing envelope which might be added to the rotor hub assembly. Space 32, which is outside rotor hub 15 and within the aero-dynamic fairing envelope can be utilized for locating the pitch changing means required for control of blade incidence. As quill shaft 22 can be a hollow member, the interior of shaft 22 can provide a convenient path for connective elements of the pitch control means to run between the rotor mounted elements and those in the helicopter fuselage.

OPERATION

In operation, quill shaft 22 rotates rotor hub 15 about rotor mast 11 which is attached to a fuselage 12 of a helicopter. Rotation of rotor hub 15, in turn, rotates flexible hub plate 23 which is attached to flange 18 of rotor hub 15. Blades 24 which are pivotally attached one each to a pitch axle 26, are, in turn, rotated by flexible hub plate 23. The flat plate region 25 of plate 23 provides a high bending stiffness in the plane of rotation, due to the width of the plate and a lesser bending stiffness in a plane normal to the plane of rotation, due to the thinness of the plate. Rotor mast 11, rotor hub 15 and torque plate 21 form a plenum 13, and air from a compressor is supplied to plenum 13 through one or more air ducts 14. Air from plenum 13 is modulated by valving means 29 and is piped to rotor blades 24 through air ducts 28.

It can thus be seen that the present invention provides an improved rotor hub for a helicopter equipped with a circulation control rotor.

Obviously many modifications and variations of the present invention are possible in the light of the above teachings. It is therefore to be understood that the invention may be practiced otherwise than as specifically described.

I claim:
1. A rotor assembly for a helicopter comprising,
   a rotor mast having a lower conical section and an upper cylindrical section, said lower conical section being adaptable for attachment to a fuselage of a helicopter,
   bearing means on said cylindrical section of said rotor mast,
   a rotor hub having a lower cylindrical section, an upper conical section having an open end, and an annular flange, said cylindrical section being rotatably supported by said bearing means on said cylindrical section of said rotor mast,
   a flexible hub plate having a central flat plate section attached to said annular flange on said rotor hub and having a plurality of radially extending pitch axles, said central flat plate section having a width substantially greater than its thickness to provide a bending stiffness in the plane of rotation higher than the bending stiffness normal to the plane of rotation,
   a torque plate closing the open end of said upper conical section of said rotor hub whereby said rotor mast, rotor hub and torque plate form an air plenum, a plurality of rotor blades pivotally attached one each to each said pitch axle, a plurality of flexible ducts connected one each between each rotor blade and said air plenum, valving means within said air plenum for regulating flow of air through said flexible ducts to said rotor blades, and shaft means engaging said torque plate for rotating said rotor hub.

2. A rotor assembly for a helicopter as set forth in claim 1 wherein said shaft means is within said air plenum.

* * * * *